US012678836B2

(12) United States Patent
Liu

(10) Patent No.: US 12,678,836 B2
(45) Date of Patent: Jul. 14, 2026

(54) METHOD AND DEVICE FOR REMOVING IMPURITIES IN GRANULES

(71) Applicant: LVFEN ENVIRONMENTAL PROTECTION TECH. CO., LTD., Beijing (CN)

(72) Inventor: Tianbo Liu, Beijing (CN)

(73) Assignee: Huachangfeng Equipment Inc., Beijing (CN)

( * ) Notice: Subject to any disclaimer, the term of this patent is extended or adjusted under 35 U.S.C. 154(b) by 6 days.

(21) Appl. No.: 18/027,135

(22) PCT Filed: Nov. 16, 2021

(86) PCT No.: PCT/CN2021/130949

§ 371 (c)(1), (2) Date: Mar. 20, 2023

(87) PCT Pub. No.: WO2022/105752

PCT Pub. Date: May 27, 2022

(65) Prior Publication Data

US 2023/0330717 A1 Oct. 19, 2023

(30) Foreign Application Priority Data

Nov. 17, 2020 (CN) ......................... 202011282872.3
Mar. 26, 2021 (CN) ......................... 202110325003.2
Mar. 26, 2021 (CN) ......................... 202120618127.5

(51) Int. Cl.
*B08B 5/02* (2006.01)
*B07B 4/02* (2006.01)
(Continued)

(52) U.S. Cl.
CPC .............. *B08B 7/026* (2013.01); *B07B 4/025* (2013.01); *B08B 5/023* (2013.01); *B08B 7/04* (2013.01)

(58) Field of Classification Search
CPC ........... B08B 7/026; B08B 5/023; B08B 7/04; B08B 13/00; B07B 4/025; B07B 7/04; B07B 7/02; B07B 4/00
See application file for complete search history.

(56) References Cited

U.S. PATENT DOCUMENTS 2,755,927 A * 7/1956 Brooks ................... B03B 4/005 366/116
3,076,545 A * 2/1963 Bodine, Jr. ............... B07B 9/02 209/1
(Continued)

FOREIGN PATENT DOCUMENTS

CN 210230592 U 4/2020
CN 211756675 U 10/2020
(Continued)

OTHER PUBLICATIONS

Machine translation of EP-0722788-A1 (Year: 1996).*

*Primary Examiner* — Erin F Bergner
(74) *Attorney, Agent, or Firm* — Bayramoglu Law Offices LLC

(57) ABSTRACT

A method and apparatus for removing impurities from granules are provided, the method includes: adopting at least one of a low-frequency acoustic wave gas guided wave mode, a high-frequency acoustic wave gas guided wave mode and a high-frequency acoustic wave solid guide mode, so that the acoustic waves are transmitted to the granules to be removed to weaken the bonding force between the granules and the impurities in the granules to be removed, while using airflow to enhance the separation of the impurities and the granules. Among them, the low-frequency acoustic wave gas guided wave mode is that the low-frequency acoustic wave is transmitted by using gas as a wave guide medium; the high-frequency acoustic wave gas
(Continued)

guided wave mode is that the high-frequency acoustic wave is transmitted by using gas as a wave guide medium.

19 Claims, 12 Drawing Sheets

(51) Int. Cl.

| | |
|---|---|
| ***B08B 7/02*** | (2006.01) |
| ***B08B 7/04*** | (2006.01) |

(56) References Cited

U.S. PATENT DOCUMENTS

| | | | | | |
|---|---|---|---|---|---|
| 3,432,892 | A | | 3/1969 | Case | |
| 5,581,626 | A | * | 12/1996 | Palmer | H03G 5/00 381/103 |
| 5,947,299 | A | * | 9/1999 | Vazquez | B03B 5/28 209/208 |
| 5,996,808 | A | * | 12/1999 | Levy | B03B 9/04 209/474 |
| 2007/0267351 | A1 | | 11/2007 | Roach et al. | |

FOREIGN PATENT DOCUMENTS

| | | | | | |
|---|---|---|---|---|---|
| CN | 112893331 | A | | 6/2021 | |
| CN | 214683290 | U | | 11/2021 | |
| EP | 0570218 | A1 | | 11/1993 | |
| EP | 0722788 | A1 | * | 7/1996 | B07B 4/00 |
| KR | 20010057448 | A | | 7/2001 | |
| WO | 9853926 | A1 | | 12/1998 | |
| WO | 0178912 | A1 | | 10/2001 | |
| WO | 2008024538 | A2 | | 2/2008 | |

* cited by examiner

METHOD AND DEVICE FOR REMOVING IMPURITIES IN GRANULES

CROSS REFERENCE TO THE RELATED APPLICATIONS

This application is the national phase entry of International Application No. PCT/CN2021/130949, filed on Nov. 16, 2021, which is based upon and claims priority to Chinese Patent Application No. 202011282872.3, filed on Nov. 17, 2020; Chinese Patent Application No. 202110325003.2, filed on Mar. 26, 2021; and Chinese Patent Application No. 202120618127.5, filed on Mar. 26, 2021, the entire contents of which are incorporated herein by reference.

TECHNICAL FIELD

The invention relates to the technical field of impurity removal, in particular to a method and device for removing impurities in granules.

BACKGROUND

There are more impurities in granular materials. These impurities exist in granular materials in the form of dust, fluff, particles, ribbons, etc., which will bring adverse effects to the subsequent production process. In order to remove these impurities, water washing method and mechanical vibration method are generally used, but these methods have the disadvantages of low separation efficiency, poor separation accuracy, high investment cost and large device size, which are difficult to remove impurities quickly and effectively.

SUMMARY

The purpose of the present invention is to provide a method and device for removing impurities in granules, so as to solve the problem of the difficulty of removing impurities quickly and effectively by the prior art.

In order to achieve the above purpose, the present invention proposes a device for removing impurities in granules, which includes a shell with a separation cavity and a supply fan for introducing airflow into separation cavity or/and an induced draft fan for inducing airflow, and further includes at least one of a low-frequency acoustic wave generating device, a first high-frequency acoustic wave generating device and a high-frequency acoustic wave solid guide assembly, where the low-frequency acoustic waves emitted by low-frequency acoustic wave generating device and the high-frequency acoustic waves emitted by the first high-frequency acoustic wave generating device can be transmitted to the particles to be removed in the separation cavity by using gas as a wave-guiding medium, the high-frequency acoustic wave solid guide assembly includes a connected second high-frequency acoustic wave generating device and solid wave guide medium, the high-frequency acoustic waves emitted by second high-frequency acoustic wave generating device can be transmitted by solid wave guide medium to the particles to be removed in the separation cavity.

The invention also proposes a method for removing impurities in granules, which includes: adopting at least one of a low-frequency acoustic wave gas guided wave mode, a high-frequency acoustic wave gas guided wave mode and a high-frequency acoustic wave solid guide mode, so that the acoustic waves are transmitted to the granules to be removed to weaken the bonding force between the granules and the impurities in the granules to be removed, while using airflow to enhance the separation of the impurities and the granules; where: the low-frequency acoustic wave gas guided wave mode is low-frequency acoustic waves with gas as a guided wave medium transmission; the high-frequency acoustic wave gas guided wave mode is high-frequency acoustic waves with gas as a guided wave medium transmission; the high-frequency acoustic wave solid guide mode is high-frequency acoustic waves with solid as a guided wave medium transmission.

The present invention also provides a device for removing impurities in granules, which is the device used in the above-mentioned method of removing impurities in granules. The device includes a shell with a separation cavity and a supply fan for introducing airflow into separation cavity or/and an induced draft fan for inducing airflow, and further includes at least one of a low-frequency acoustic wave generating device, a first high-frequency acoustic wave generating device and a high-frequency acoustic wave solid guide assembly. The working mode of the low-frequency acoustic wave generating device is the low-frequency acoustic wave gas guided wave mode, the working mode of the first high-frequency acoustic wave generating device is the high-frequency acoustic wave gas guided wave mode, the working mode of the high-frequency acoustic wave solid guide assembly is the high-frequency acoustic wave solid guide mode, the high-frequency acoustic wave solid guide assembly includes a connected second high-frequency acoustic wave generating device and solid wave guide medium.

The features and advantages of the method and device for removing impurities in granules of the present invention include:

The invention utilizes the sound energy of the acoustic wave to play the role of acoustic fatigue on the granules and the impurities attached to the surface thereof, which can weaken or even remove the bonding force between the granules and the impurities, so that a gap or separation is formed between the two, the attached impurities can be converted into dispersed impurities, and the dispersed impurities can be blown from the granules with the wind airflow, so as to realize the efficient separation of the granules and the impurities, so that the granules can be deeply purified. Compared with the existing technology, the present invention can quickly and effectively remove the impurities in the granules, especially the attached impurities, and the method of the present invention can remove the impurities in the granules with high separation efficiency, high separation accuracy and low investment cost.

BRIEF DESCRIPTION OF THE DRAWINGS

The following accompanying drawings are intended only to provide a schematic illustration and explanation of the present invention and do not limit the scope of the present invention.

Among them.

DETAILED DESCRIPTION OF THE EMBODIMENTS

Figure 1:
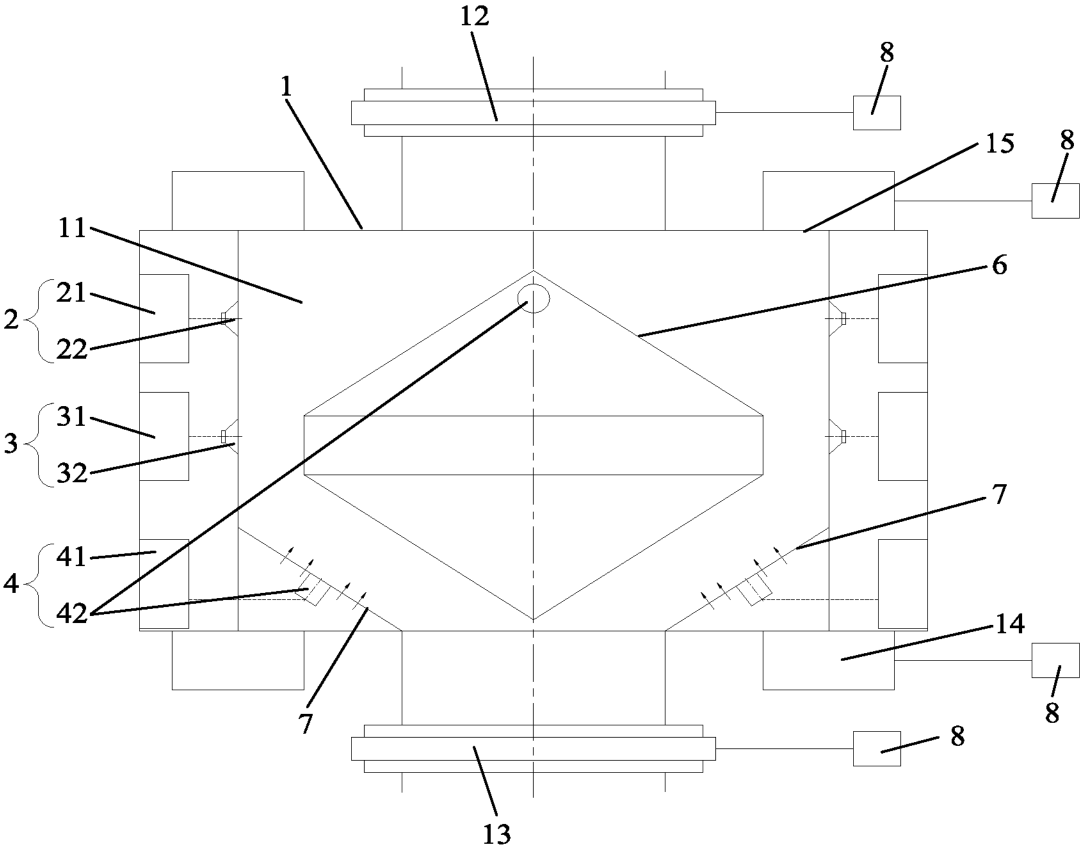
FIG. 1 is a schematic diagram of a planar structure of a device for removing impurities in granules of an embodiment of the present invention

In order to have a clearer understanding of the technical features, purposes and effects of the present invention, the specific embodiments of the present invention will now be described with reference to the accompanying drawings. Among them, the use of adjective or adverbial modifiers "upper" and "lower", "top" and "bottom", "inner" and "outer" is only for the convenience of relative reference between groups of terms, and not for describing any particular directional limitation of the modified term. In addition, the terms "first", "second", etc. are only used for descriptive purposes, and should not be understood as indicating or implying relative importance or indicating the number of technical features indicated, thus, the definition of "first", "second", etc. features may expressly or implicitly include one or more of such features. In the description of the present invention, unless otherwise specified, "plurality" means two or more. In the description of the present invention, unless otherwise specified, the term "connection" should be understood in a broad sense, for example, it may be a fixed connection, a detachable connection, a direct connection, or an indirect connection through an intermediate medium. For ordinary technical personnel in this field, the specific meaning of the above terms in this patent can be understood according to the specific situation.

For the convenience of description, the granular material is referred to as "granules" and the granules with adsorbed impurities are referred to as "granules to be removed".

The impurities in the granules mainly exist in the granules in two forms: dispersed and attached. The attached impurities are attached (adsorbed) on the surface of the granules due to the electromagnetic force, liquid bridge force, van der Waals force and other binding forces, which are the difficulty and the key point of cleaning the granules. The existing technology usually uses water washing method, mechanical vibration method, etc. to remove impurities in the granules, but these methods have low separation efficiency, poor separation accuracy, high investment costs and large device size, etc., it is difficult to quickly and effectively remove impurities, especially difficult to remove the attached impurities.

Implementation I

In order to solve the above-mentioned problems of the prior art, the present invention provides a method for removing impurities in granules, including: adopting at least one of a low-frequency acoustic wave gas guided wave mode, a high-frequency acoustic wave gas guided wave mode and a high-frequency acoustic wave solid guide mode. This mode enables the sound energy of the acoustic wave to be transmitted to the granules to be removed, so as to weaken the bonding force between the granules and the impurities in the granules to be removed, such as electromagnetic force, liquid bridge force, van der Waals force, etc. At the same time, air flow is used to strengthen the separation of impurities and granules, such as blowing wind to the granules to be removed, so as to blow the impurities away from the granules, so as to completely separate the granules and impurities; where: the low-frequency acoustic wave gas guided wave mode is low-frequency acoustic waves with gas as a guided wave medium transmission; the high-frequency acoustic wave gas guided wave mode is high-frequency acoustic waves with gas as a guided wave medium transmission; the high-frequency acoustic wave solid guide mode is high-frequency acoustic waves with solid as a guided wave medium transmission. The frequency of the low-frequency acoustic wave is 1 Hz~350 Hz, preferably 10 Hz~350 Hz, the frequency of the high-frequency acoustic wave is 6 kHz~40 kHz, such as 9 kHz, 12 kHz, preferably, the frequency of the high-frequency acoustic wave is 6 Hz~20 Hz.

The invention utilizes the sound energy of the acoustic wave to play the role of acoustic fatigue on the granules and the impurities attached to the surface thereof, which can weaken or even remove the bonding force between the granules and the impurities, so that a gap or separation is formed between the two, the attached impurities can be converted into dispersed impurities, and the dispersed impurities can be blown from the granules with the wind airflow, so as to realize the efficient separation of the granules and the impurities, so that the granules can be deeply purified. Compared with the existing technology, the present invention can quickly and effectively remove the impurities in the granules, especially the attached impurities, and the method of the present invention can remove the impurities in the granules with high separation efficiency, high separation accuracy and low investment cost.

When the method of the present invention is implemented, any one of the three modes may be used, any two modes of the three modes may be used simultaneously, or all three modes may be used at the same time. For example, only the low-frequency acoustic wave gas guided wave mode, or only the high-frequency acoustic wave gas guided wave mode, or both the low-frequency acoustic wave gas guided wave mode and the high-frequency acoustic wave gas guided wave mode, or both the low-frequency acoustic wave gas guided wave mode and high-frequency acoustic wave solid guide mode, or both high-frequency acoustic wave gas guided wave mode and high-frequency acoustic wave solid guide mode, or simultaneously use low-frequency acoustic wave gas guided wave mode, high-frequency acoustic wave gas guided wave mode and high-frequency acoustic wave solid guide mode.

The mechanism of the low-frequency acoustic wave gas guided wave mode on the impurity-removing particles is: the low-frequency acoustic wave energy of this mode has an acoustic fatigue effect on the binding force between the impurities on the surface of the particles and the particles, and the intensity of the acoustic wave is called the acoustic wave energy flux density, the intensity of the acoustic wave is proportional to the square of the amplitude of the acoustic wave. Under the action of the low-frequency acoustic wave with a certain acoustic wave energy flux density, the bonding force between the impurities on the granules and the granules can be greatly weakened, and the bonding force can even be close to zero, so that the granules and impurities can be separated or separated in space, and the attached impurities can be transformed into dispersed impurities.

The mechanism of the high-frequency acoustic wave gas guided wave mode on the impurity-removing particles is as follows: the high-frequency acoustic wave of this mode not only has the above-mentioned effectiveness of the low-frequency acoustic wave, but also has a strong penetrating power, which can greatly weaken the bonding force between the particles and impurities, so that the granules and impurities can be separated or separated in space, and the attached impurities can be transformed into dispersed impurities.

The mechanism of the combination of the low-frequency acoustic wave gas guided wave mode and the high-frequency acoustic wave gas guided wave mode on the impurity-removing particles is as follows: on the basis of the low-frequency acoustic wave, the high-frequency acoustic wave is applied to strengthen the elimination of the binding force between the particles and the impurities. The introduced high-frequency acoustic wave can further weaken the binding force, causing a gap between the granules and the impurities on the surface and increase the gap, thereby enhancing the effect of separation and cleaning.

The mechanism of the high-frequency acoustic wave solid guide mode on the impurity-removing particles is as follows: the wave energy of the high-frequency acoustic wave is transmitted to the solid wave guide medium, which makes the solid wave guide medium fluctuate with the high frequency acoustic wave. The high-frequency acoustic wave directly acts on the particles to be removed in contact with the solid wave guide medium, thereby producing a fatigue effect on the binding force between the particles and impurities of the particles to be removed flowing through the solid wave guide medium, so that the bonding force between the two can be weakened or removed, so that there is a gap or separation between the impurities attached to the surface of the granules and the granules, and the attached impurities are transformed into dispersed impurities.

In one embodiment, at least two modes in the low-frequency acoustic wave gas guided wave mode, the high-frequency acoustic wave gas guided wave mode and the high-frequency acoustic wave solid guide mode are used to transmit the acoustic waves to the particles to be removed to further enhance the effect of removing impurities. For example, any two modes of the low-frequency acoustic wave gas guided wave mode, the high-frequency acoustic wave gas guided wave mode, and the high-frequency acoustic wave solid guide mode are simultaneously employed, or these three modes are simultaneously employed.

The inventor has found that the frequency, amplitude and waveform of the acoustic waves also affect the effect of weakening the bonding force between the granules and impurities. Therefore, when the present invention is implemented, the frequency, amplitude and waveform of the acoustic waves in each mode can be determined according to actual needs.

In one embodiment, the frequency of the low-frequency acoustic wave in the low-frequency acoustic wave gas guided wave mode is one frequency or a combination of multiple frequencies; the frequency of the high-frequency acoustic wave in the high-frequency acoustic wave gas guided wave mode is one frequency or a combination of multiple frequencies; the frequency of the high-frequency acoustic wave in the high-frequency acoustic wave solid guide mode is one frequency or a combination of multiple frequencies. That is, in each mode, an acoustic wave of one frequency can be used, or a plurality of acoustic waves of different frequencies can be used simultaneously. For high-frequency acoustic waves, the higher the frequency, the stronger the vibration penetration ability of the granules.

Taking the low-frequency acoustic wave gas guided wave mode as an example, a low-frequency acoustic wave of one frequency can be used, or a plurality of low-frequency acoustic waves of different frequencies can be used at the same time. When two modes or three modes are used at the same time, a variety of high-frequency acoustic waves of different frequencies and a variety of low-frequency acoustic waves of different frequencies can be used at the same time. When using the acoustic wave combination method of high and low frequency bands, the acoustic waves of different frequency bands can be based on the characteristics of the material with one being the main and the other being supplemented, or both kinds of acoustic waves are the main ones.

In the process of removing impurities, the frequency of the acoustic wave can be fixed frequency, adjustable frequency, or even sweeping frequency (frequency automatic conversion), and the frequency can be manually controlled or automatically adjusted.

In one embodiment, the amplitude of the low-frequency acoustic waves in the low-frequency acoustic wave gas guided wave mode is one amplitude or a combination of multiple amplitudes; the amplitude of the high-frequency acoustic waves in the high-frequency acoustic wave gas guided wave mode is one amplitude or a combination of multiple amplitudes; the amplitude of the high-frequency acoustic waves in the high-frequency acoustic wave solid guide mode is one amplitude or a combination of multiple amplitudes. The amplitude of the acoustic waves in each mode is less than or equal to 85 decibels at a distance of 1 meter outside the equipment (or to meet the local environmental protection requirements). And the higher the frequency of the acoustic waves, the better the effect of weakening the bonding force between the granules and impurities in the case of meeting this condition.

In one embodiment, the waveform of the low-frequency acoustic wave in the low-frequency acoustic wave gas guided wave mode is one waveform or a combination of multiple waveforms, the waveform of the high-frequency acoustic wave in the high-frequency acoustic wave gas guided wave mode is one waveform or a combination of multiple waveforms, and the waveform of the high-frequency acoustic wave in the high-frequency acoustic wave solid guide mode is one waveform or a combination of multiple waveforms. Available waveforms include sine wave, triangle wave, square wave and pulse wave, and multiple waveforms can be used simultaneously in the implementation.

Taking the high-frequency acoustic wave gas guided wave mode as an example, a high-frequency acoustic wave with one waveform can be used, or a variety of high-frequency acoustic waves with different waveforms can be used at the same time. When two modes or three modes are used at the same time, multiple high-frequency acoustic waves with different waveforms and low-frequency acoustic waves with multiple different waveforms can be used at the same time.

According to the requirements of the degree of cleanliness of separation of particles and impurities, when the degree of cleanliness of the separation is required to be high, the three modes can be used together, and the amplitude is adjusted to the limit of noise control, and the use of low-frequency acoustic waveform of the lower frequency (for example, 1 Hz~20 Hz), high-frequency acoustic waveform of the higher frequency (for example, 30 kHz~40 kHz), as far as possible to use a single frequency sine wave; and when the degree of cleanliness of the separation requirements are low, the requirements can be reduced according to cost or other factors, using one of the modes or two modes as the dominant, or waveform and mode and amplitude of the organic combination of various combinations of ways; in the case of extremely high separation and cleanliness requirements, it is also possible to increase the sonication effect of the low-frequency acoustic wave solid guide mode on the basis of the high-frequency acoustic wave solid guide mode, so as to further exert and tap the effect of acoustic waves.

In one embodiment, in the state where the particles to be removed are flowing, at least one of the low-frequency acoustic wave gas guided wave mode, the high-frequency acoustic wave gas guided wave mode and the high-frequency acoustic wave solid guide mode is used to transmit the acoustic wave to the granules to be removed. For example, setting a chamber for the impurity-removing granules to flow through, and introducing acoustic waves into the chamber, because the impurity-removing granules are in a flowing state rather than static accumulation, the effect of removing impurities can be further improved, and it is also beneficial for the wind flow to blow away impurities.

In one embodiment, in a state where at least one of plasma, microwave, infrared, and dry ice is applied to the granules to be removed, at least one of a low-frequency acoustic wave gas guided wave mode, a high-frequency acoustic wave gas guided wave mode, and a high-frequency acoustic wave solid guide mode is used to deliver acoustic waves to the granules to be removed, so as to further improve the effect of removing impurities. For example, at least two, or at least three, or four of plasma, microwave, infrared, and dry ice are applied to the granules to be removed at the same time.

In one embodiment, the solid wave guide medium in the high-frequency acoustic wave solid guide mode is a thin film, a metal plate or a plastic plate, and of course it can be a variety of other solid substances and forms suitable for the corresponding working conditions, the use of a variety of solid wave guide medium can be used at the same time. For example, the solid wave guide medium is a slip sheet, a distributor or/and a fluidized plate, etc.

In the present invention, the granular material is generally a granular solid material with a particle size between 0.8 mm~20 mm, and its shape can be spherical, oval, square, cylindrical, drop-shaped or other irregular shapes. Impurities are generally dust, fluff, ribbons, debris, water droplets, flakes, debris, dust, droplets, etc. interspersed in the granular material. Dust, dirt, and debris generally refer to particles with a particle size of less than 500 μm, the material of impurities can be the same as the granular material, or different from the granular material, the impurities can be particles, ribbons or fluff, and the impurities can be solid particles or liquid droplets.

Implementation II

As shown in FIG. 1, the present invention also provides a device for removing impurities in granules, which is a device used in the method for removing impurities in granules in Implementation I. The device includes a housing 1 with a separation cavity 11 inside, and also includes at least one of the low-frequency acoustic wave generating device 2, the first high-frequency acoustic wave generating device 3 and the high-frequency acoustic wave solid guide assembly, and a supply fan for introducing airflow Q into the separation cavity 11 or/and an induced draft fan for introducing airflow Q.

Where the working mode of the low-frequency acoustic wave generating device is the low-frequency acoustic wave gas guided wave mode described in Implementation I, and the working mode of the first high-frequency acoustic wave generating device is the high-frequency acoustic wave gas guided wave mode described in Implementation I, and the working mode of the high-frequency acoustic wave solid guide assembly is the high-frequency acoustic wave solid guide mode described in Implementation I. The low-frequency acoustic waves emitted by the low-frequency acoustic wave generating device 2 and the high-frequency acoustic waves emitted by the first high-frequency acoustic wave generating device 3 can use the gas in the separation cavity 11 as the wave guide medium, and are transferred to the particles to be removed in the separation cavity 11. The high-frequency acoustic wave solid guide assembly includes the connected second high-frequency acoustic wave generating device 4 and the solid wave guide medium, which needs to be set in the separation cavity 11 and is located on the only path of the particles K1 to be removed. The high-frequency acoustic wave emitted by the second high-frequency acoustic wave generating device 4 uses the solid wave guide medium as the wave guide medium, and is transmitted to the granules K1 to be removed in the separation cavity 11. The acoustic wave acting on the granules to be removed K1 can weaken the binding force between the granules and the impurities, and the airflow Q generated by the fan can blow the impurities away from the granules, so that the impurities and the granules are completely separated, and the clean granules K2 are obtained.

The frequency of the low frequency acoustic wave that the low frequency acoustic wave generating device 2 sends in the present invention is 1 Hz~350 Hz, for example 10 Hz~350 Hz, the frequency of the high frequency acoustic wave that the first high frequency acoustic wave generating device 3 and the second high frequency acoustic wave generating device 4 send is 6 kHz~40 kHz, for example 9 kHz, 12 kHz. Preferably, the frequency of the high-frequency acoustic waves is 6 Hz~20 Hz.

When the device of the present invention is in use, only one of the low-frequency acoustic wave generating device 2, the first high-frequency acoustic wave generating device 3 and the high-frequency acoustic wave solid guide assembly can be turned on to use one mode of acoustic waves, or any two can be turned on at the same time to use any two modes of acoustic waves at the same time, or all three can be turned on at the same time to use three modes of acoustic waves at the same time.

The action mechanism of the low-frequency acoustic wave generating device 2, the first high-frequency acoustic wave generating device 3 and the high-frequency acoustic wave solid guide assembly in the present invention for treating the impurity-removing granules is the same as the action mechanism of the three modes in Implementation I for treating the impurity-removing granules, so it is not repeated.

In one embodiment, as shown in FIG. 1, the low-frequency acoustic wave generating device 2 includes a low-frequency acoustic wave generator 21 and a low-frequency acoustic wave converter 22 (or referred to as a low-frequency acoustic wave transducer), and the low-frequency acoustic wave converter 22 is used to receive the acoustic wave signal from the low-frequency acoustic wave generator 21 and convert it into a low-frequency acoustic wave. The low-frequency acoustic wave signal generated by the low-frequency acoustic wave generator 21 may be generated by electromagnetic oscillation, or may be generated by compressed air, mechanical vibration, piezoelectric materials and other methods.

When the low-frequency acoustic wave signal is generated by electromagnetic oscillation, the low-frequency acoustic wave generator 21 and the low-frequency acoustic wave converter 22 are electrically connected. When using compressed air to generate a low-frequency acoustic wave signal, the low-frequency acoustic wave generator 21 and the low-frequency acoustic wave converter 22 are connected through pipes.

In this embodiment, a low-frequency acoustic wave generator 21 may be connected to a low-frequency acoustic wave converter 22, or a low-frequency acoustic wave generator 21 may be connected to a plurality of low-frequency acoustic wave converters 22, or a sonic generator that emits low-frequency acoustic waves and high-frequency acoustic waves, with one or more converters and other various modes. The low-frequency acoustic wave generator 21 and the low-frequency acoustic wave converter 22 may be the same integrated device with both acoustic wave generation and acoustic wave conversion functions, or may be two devices with acoustic wave generation and acoustic wave conversion functions respectively.

In one embodiment, as shown in FIG. 1, the first high-frequency acoustic wave generating device 3 includes a first high-frequency acoustic wave generator 31 and a first high-frequency acoustic wave converter 32, and the second high-frequency acoustic wave generating device 4 includes a second high-frequency acoustic wave generator 41 and a second high-frequency acoustic wave converter 42, the first high-frequency acoustic wave generator 31 and the first high-frequency acoustic wave converter 32 are electrically connected, and the second high-frequency acoustic wave generator 41 and the second high-frequency acoustic wave converter 42 are electrically connected, and the high-frequency acoustic wave converter is used to receive the acoustic wave signal from the high-frequency acoustic wave generator and convert it into a high-frequency acoustic wave. The high-frequency acoustic wave signal generated by the high-frequency acoustic wave generator can be generated by electromagnetic oscillation, but also by compressed air, mechanical vibration, piezoelectric materials and other methods. The second high-frequency acoustic wave converter 42 of the second high-frequency acoustic wave generating device 4 is mechanically connected to the solid wave guide medium, and the acoustic wave of the second high-frequency acoustic wave converter 42 is transmitted to the solid wave guide medium, so that the solid wave guide medium generates mechanical vibration, and the mechanical vibration is then transmitted to the particles K1 to be removed. For example, the low-frequency acoustic converter 22 and the first high-frequency acoustic converter 32 are both speakers, and the second high-frequency acoustic converter 42 is an electromagnetic oscillator or a pneumatic vibrator.

In this embodiment, a high-frequency acoustic wave generator can be connected to a high-frequency acoustic wave converter, or a high-frequency acoustic wave generator can be connected to a plurality of high-frequency acoustic wave converters, or a sonic generator that emits low-frequency acoustic waves and high-frequency acoustic waves, with one or more converters and other various modes. The high-frequency acoustic wave generator and the high-frequency acoustic wave converter may be the same integrated device with both acoustic wave generation and acoustic wave conversion functions, or may be two devices with acoustic wave generation and acoustic wave conversion functions respectively.

The low-frequency acoustic wave generating device 2, the first high-frequency acoustic wave generating device 3 and the second high-frequency acoustic wave generating device 4 of the present invention can be arranged outside the casing 1, or can be arranged in the separation cavity 11, and of course can also be partially arranged in the casing 1, the other part is set in the separation cavity 11, for example, the acoustic wave generator is set outside the casing 1, and the acoustic wave converter is set in the separation cavity 11, so that the separation cavity 11 is filled with low-frequency acoustic waves and high-frequency acoustic waves with gas as the wave guide medium.

The frequencies of the acoustic waves emitted by the low-frequency acoustic wave generating device 2, the first high-frequency acoustic wave generating device 3 and the second high-frequency acoustic wave generating device 4 in the present invention may be fixed frequency, adjustable frequency, or frequency sweeping (i.e., frequency automatic conversion), and the frequency can be manually controlled or automatically adjusted. The amplitude of the acoustic wave generator can be adjustable or fixed.

In the present invention, the low-frequency acoustic wave generator 21 and the low-frequency acoustic wave converter 22 of the low-frequency acoustic wave generating device 2 may be electric or gas type, and may be integrated or separated; the first high-frequency acoustic wave generator 31 and the first high-frequency acoustic wave converter 32 of the first high-frequency acoustic wave generating device 3 may be electric or gas type, and may be integrated or separated; the second high-frequency acoustic wave generator 41 and the second high-frequency acoustic wave converter 42 of the second high-frequency acoustic wave generating device 4 may be electric or gas type, and may be integrated or separated.

In one embodiment, the shell 1 is provided with a granule inlet 12 and a granule outlet 13 which are respectively communicated with the separation cavity 11, and the separation cavity 11 is provided with a drainage device for guiding the flow of the particles K1 to be removed in the separation cavity 11, the drainage device is arranged between the granule inlet 12 and the granule outlet 13, and the granule K1 to be removed enter the separation cavity 11 from the granule inlet 12. Under the drainage action of the drainage device, the impurity-removing granules K1 flow in the separation cavity 11 in a dispersed state rather than a piled state, so as to improve the effect of acoustic waves and airflow on the impurity-removing granules K1. After the impurities are removed, the clean granules K2 leave the separation cavity 11 from the granule outlet 13.

Figure 2:
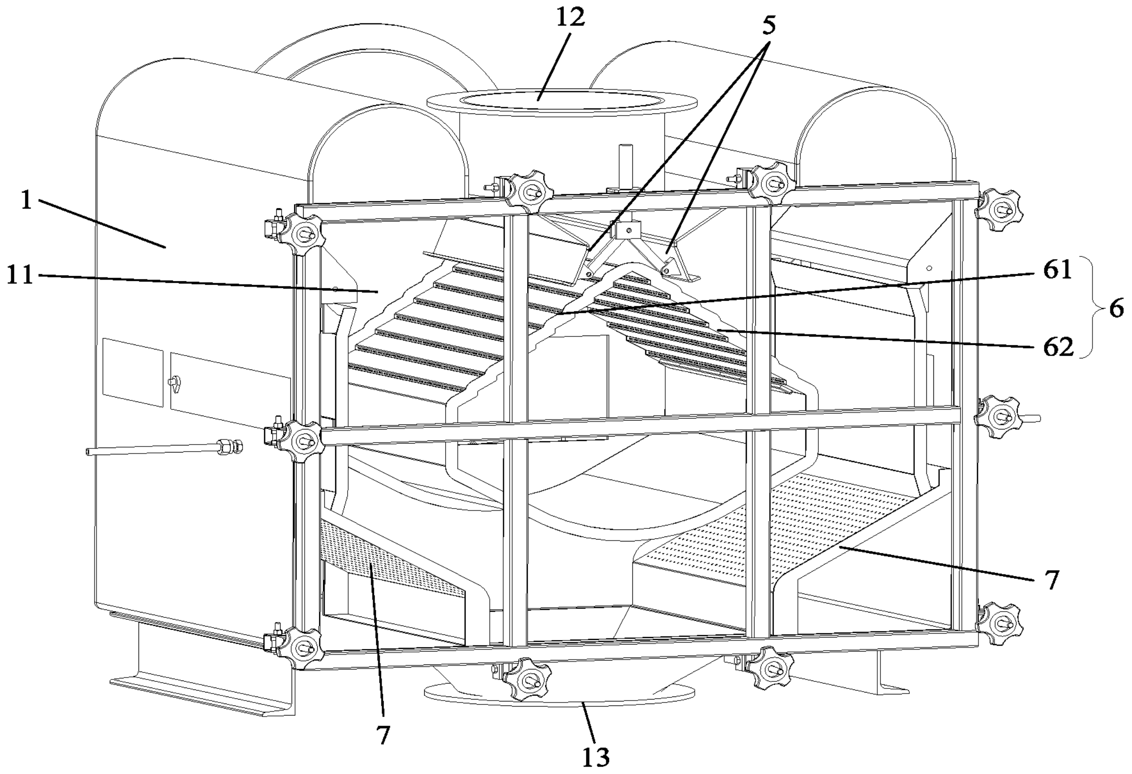
FIG. 2 is a schematic diagram of the three-dimensional structure of the device for removing impurities in granules of an embodiment of the present invention

Regarding the drainage device, there are at least the following embodiments:

In one embodiment, as shown in FIG. 2, the drainage device includes a sliding plate 6 for guiding the to-be-removed granules K1 to slide down.

In another embodiment, the drainage device includes a fluidizing plate 7 for guiding the to-be-removed granules K1 to slide down.

In yet another embodiment, the drainage device includes a sliding plate 6 and a fluidizing plate 7 for guiding the particles K1 to be removed to slide down, and the fluidizing plate 7 is located below the sliding plate 6.

In the first feasible technical solution, the sliding plate 6 is an inverted V-shaped structure formed by the connection of two symmetrically arranged first sliding plates 61 and second sliding plates 62, that is, the first sliding plate 61 and the second sliding plate 62 are in an inclined state, and the upper ends of the two are connected and the lower ends are spaced apart, and the granule inlet 12, the sliding plate 6 and the granule outlet 13 are arranged correspondingly from top to bottom, and the granule inlet 12 faces the upper end of the sliding plate 6, so that the aggregate K1 to be removed can fall to the upper end of the sliding plate 6, and the granule to be removed K1 is divided into two parts from the upper end of the sliding plate 6, and slide down along the first sliding plate 61 and the second sliding plate 62 respectively.

The working process is as follows: the impurity-removing granules K1 enter the separation cavity 11 from the granule inlet 12 and fall on the upper end of the sliding plate 6, and then are divided into two parts to slide down along the first sliding plate 61 and the second sliding plate 62 respectively. At the same time, the acoustic waves from at least one of the low-frequency acoustic wave generating device 2, the first high-frequency acoustic wave generating device 3 and the high-frequency acoustic wave solid guide assembly act on the particles to be removed K1, so as to weaken or even eliminate the binding force between granules and impurities. At the same time, the airflow Q generated by the fan blows towards the granules to be removed, the wind airflow blows the impurities away from the granules, the clean granules K1 fall out from the granule outlet 13, and the wind airflow carries the solid impurities and is discharged from the separation cavity 11, so as to realize the complete separation of impurities and granules.

In this solution, by setting the first sliding plate 61 and the second sliding plate 62, the particles to be removed can be guided to slide downward in the separation cavity 11, and the stay time of the particles to be removed in the separation cavity 11 can be prolonged, thereby further improve the effect of removing impurities.

In this solution, as shown in FIG. 2, the drainage device further includes two fluidizing plates 7, which are densely covered with air holes, and the two fluidizing plates 7 are located under the first sliding plate 61 and the second sliding plate 62 respectively, and face the first sliding plate 61 and the second sliding plate 62 respectively. The two fluidizing plates 7 are inclined toward each other from top to bottom, and the granule outlet 13 is located between the lower ends of the two fluidizing plates 7. Therefore, the impurity-removing granules K1 first slide down along the first sliding plate 61 and the second sliding plate 62, then fall on the two fluidizing plates 7, and then slide down the two fluidizing plates 7 to the granule outlet 13, the clean granules K2 fall out from the granule outlet 13.

In this embodiment, at least one of the sliding plate 6 and the fluidizing plate 7 is connected to the second high-frequency acoustic wave generating device 4 as a solid wave guide medium. Therefore, the sliding plate 6 and/or the fluidizing plate 7 not only guide the particles to slide down, but also plays the role of transmitting acoustic waves to the granules to be removed. In addition, the fluidizing plate 7 also acts as a collecting device to gather the clean granules.

Figure 10:
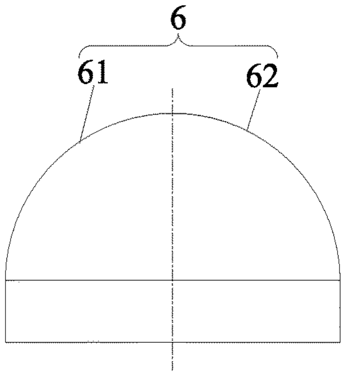
FIG. 10 is a main view of a fourth type of skateboard.
Figure 11:
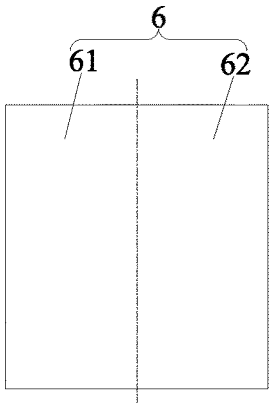
FIG. 11 is a top view of the skateboard in FIG. 10.

Among them, the overall shape of the first sliding plate 61 may be a flat plate (as shown in FIG. 2), a concave arc-shaped plate (as shown in FIGS. 6, 7, 14, and 15), or a convex curved plate (as shown in FIG. 10 and FIG. 11), and the overall shape of the second sliding plate 62 can be a flat plate (as shown in FIG. 2), or a concave curved plate (as shown in FIG. 6, FIG. 7, FIG. 14, FIG. 15), and may also be an outwardly convex curved plate (as shown in FIG. 10, FIG. 11).

Figure 3:
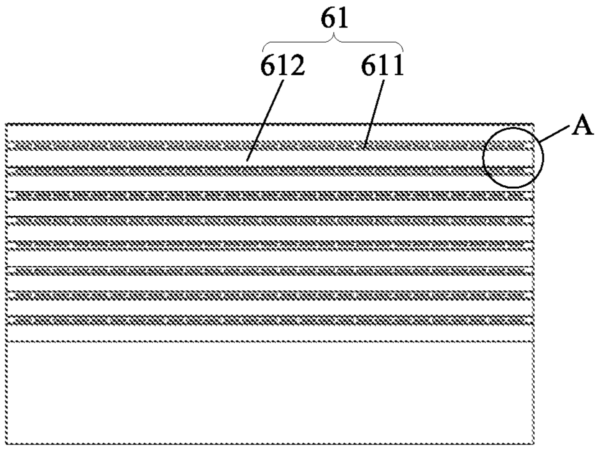
FIG. 3 is a top view of the first skid in FIG. 2
Figure 4:
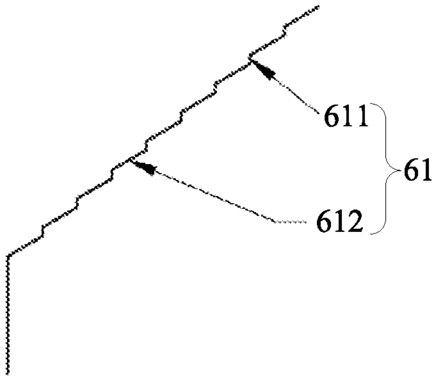
FIG. 4 is a side view of the skid plate in FIG. 3.

Further, as shown in FIG. 2, FIG. 3, and FIG. 4, the structures of the first sliding plate 61 and the second sliding plate 62 are the same, both of which are stepped plate structures. The first sliding plate 61 is taken as an example for introduction. A plurality of vertical plates 611 and a plurality of inclined plates 612 are connected in sequence, and the angle between the inclined plates 612 and the vertical plates 611 is greater than 90° and less than 180°, where the vertical plates 611 make the aggregate K1 to be removed quickly fall, and the aggregate K1 to be removed plays a role of flow acceleration, and when the impurity-removing granules K1 fall to the inclined plates 612, vibration is generated, which helps to separate the impurities and the granules, and the inclined plates 612 guide the impurity-removing granules K1 to slide down.

Figure 5:
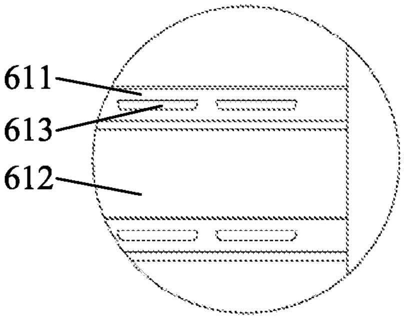
FIG. 5 is a partially enlarged view at A in FIG. 3.
Figure 6:
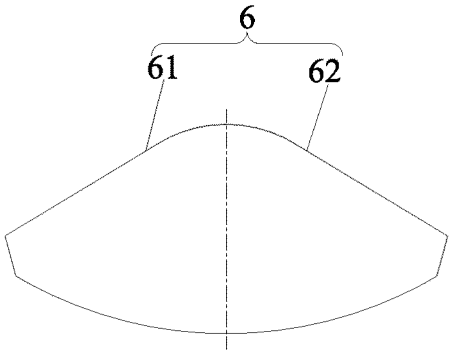
FIG. 6 is a main view of a second type of skateboard.
Figure 7:
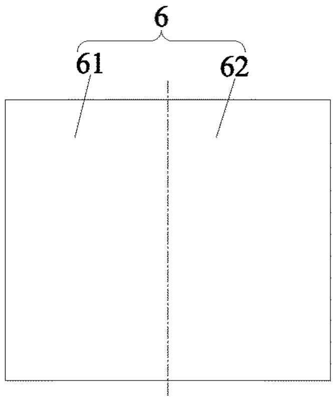
FIG. 7 is a top view of the skateboard in FIG. 6.
Figure 8:
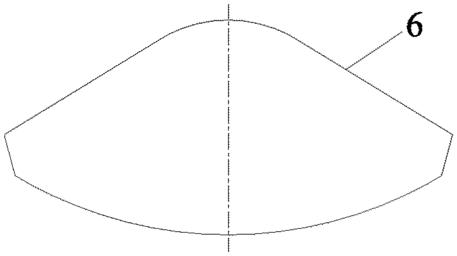
FIG. 8 is a main view of a third type of skateboard.
Figure 9:
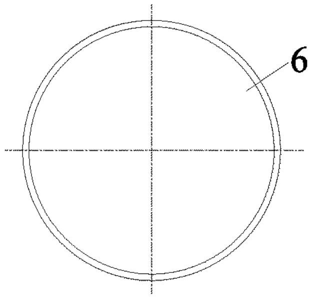
FIG. 9 is a top view of the skateboard in FIG. 8.

Furthermore, as shown in FIG. 5, through holes 613 are densely distributed on the vertical plates 611, and the through holes 613 allow airflow to pass through.

Figure 20:
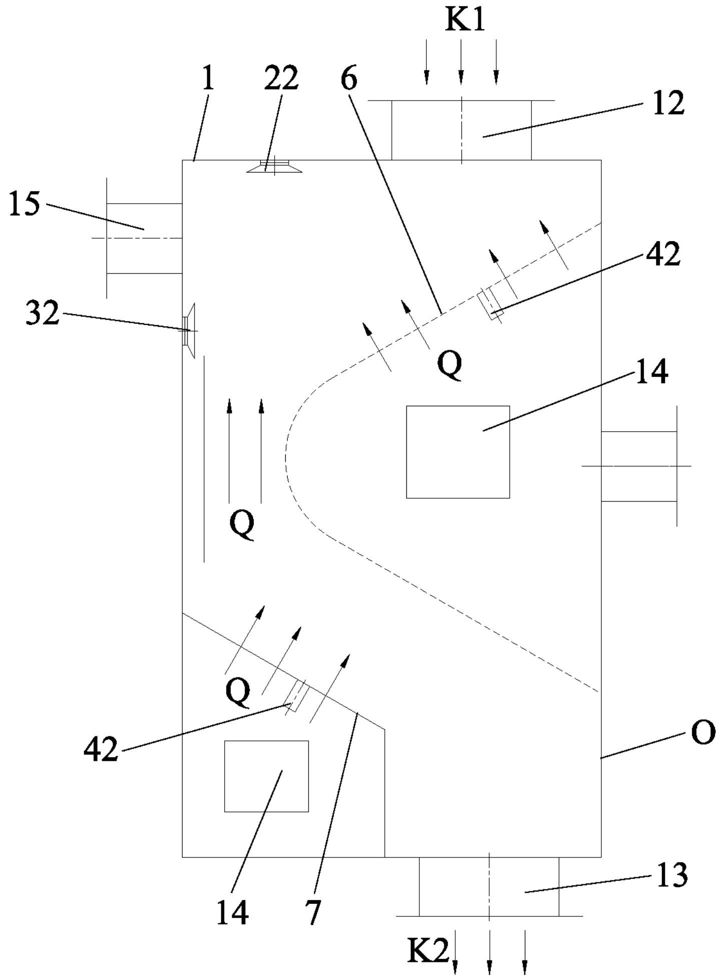
FIG. 20 is a schematic diagram of a first fabric way.
Figure 21:
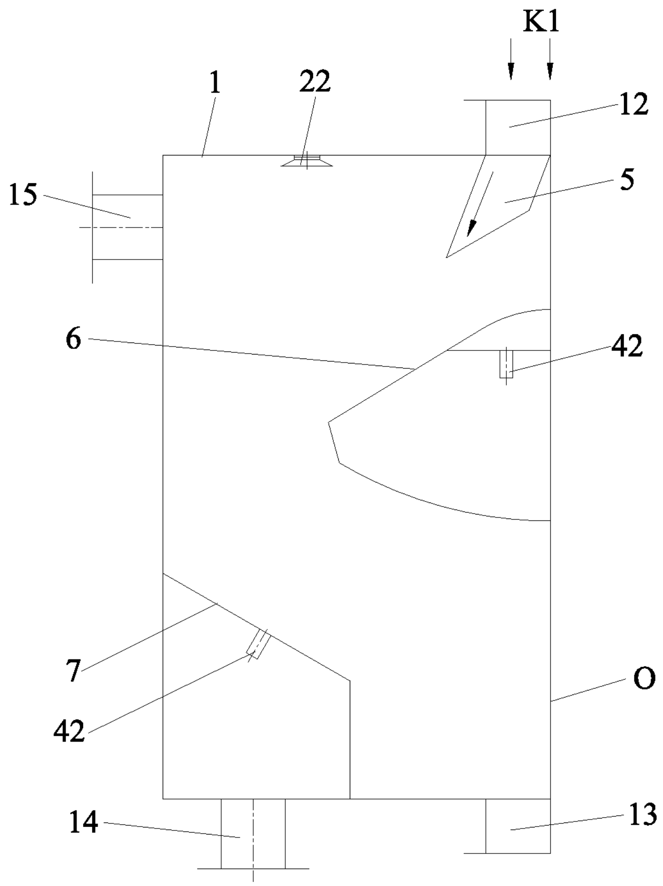
FIG. 21 is a schematic diagram of the second fabric way.

In the second feasible technical solution, the sliding plate 6 is roughly a C-shaped plate (as shown in FIG. 20 and FIG. 21), and both ends of the sliding plate 6 are fixed on the side wall of the housing 1.

In this solution, the structure of the sliding plate 6 can be the same as the structure of the first sliding plate 61 and the second sliding plate 62 in the first solution, which is a stepped plate structure.

In this solution, the drainage device may further include a fluidizing plate 7 (as shown in FIG. 20 and FIG. 21), and the fluidizing plate 7 is located below the sliding plate 6 and is used to receive the granules falling from the sliding plate 6.

Figure 12:
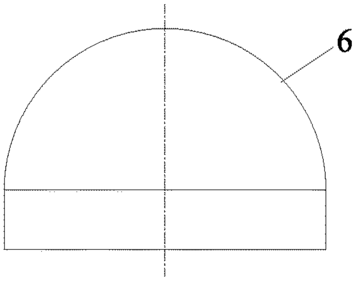
FIG. 12 is a main view of a fifth type of skateboard.
Figure 13:
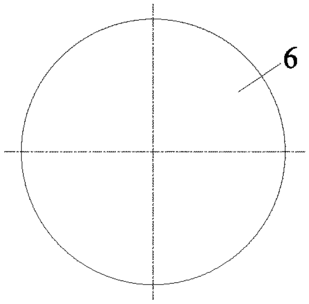
FIG. 13 is a top view of the skateboard in FIG. 12.
Figure 14:
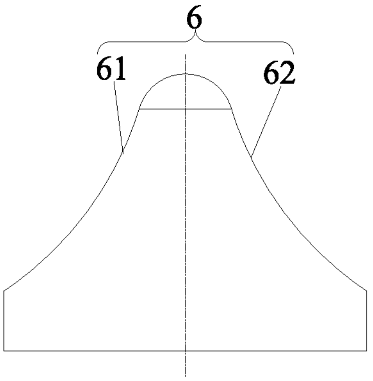
FIG. 14 is a main view of a sixth type of skateboard.
Figure 15:
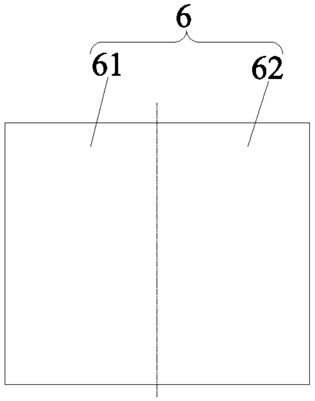
FIG. 15 is a top view of the skateboard in FIG. 14.
Figure 16:
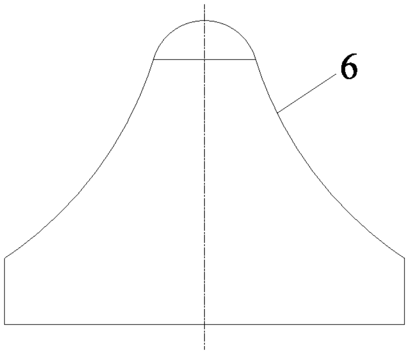
FIG. 16 is a main view of a seventh type of skateboard.
Figure 17:
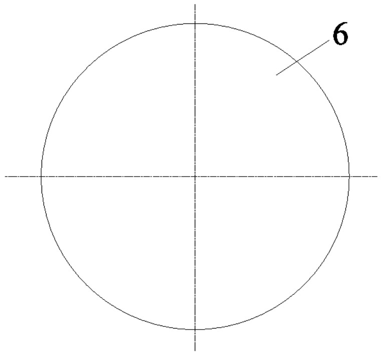
FIG. 17 is a top view of the skateboard in FIG. 16.

In a third feasible technical solution, the sliding plate 6 is a substantially conical cylinder (as shown in FIG. 8, FIG. 9, FIG. 12, FIG. 13, FIG. 16, FIG. 17) which has an inwardly concave arc (as shown in FIG. 8, FIG. 9, FIG. 16, FIG. 17) or an outwardly convex arc (as shown in FIG. 12, FIG. 13).

In this solution, the structure of the sliding plate 6 can be the same as the structure of the first sliding plate 61 and the second sliding plate 62 in the first solution, which is a stepped plate structure.

In this solution, the drainage device may further include two fluidizing plates 7, and the two fluidizing plates 7 are located below the sliding plate 6 and are used to receive the granules falling from the sliding plate 6.

Figure 18:
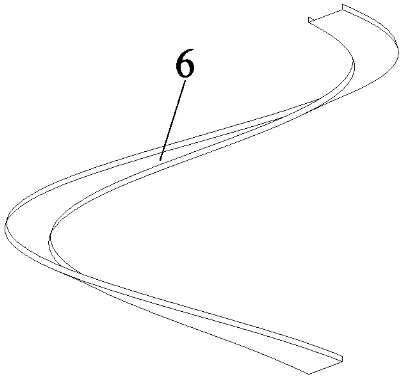
FIG. 18 is a main view of the eighth type of skateboard.
Figure 19:
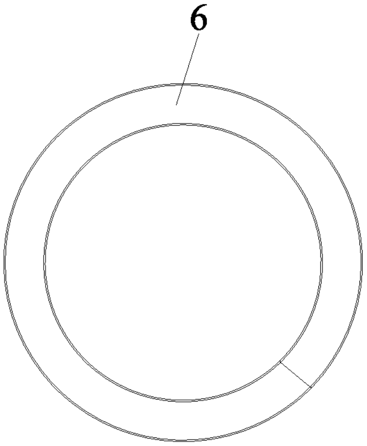
FIG. 19 is a top view of the skateboard in FIG. 18.

In a fourth feasible technical solution, the sliding plate 6 is roughly an S-shaped plate (as shown in FIGS. 18 and 19), similar to a curved slide.

In this solution, the structure of the sliding plate 6 can be the same as the structure of the first sliding plate 61 and the second sliding plate 62 in the first solution, which is a stepped plate structure.

In this solution, the drainage device may further include a fluidizing plate 7, and the fluidizing plate 7 is located below the sliding plate 6 and is used for receiving the granules falling from the sliding plate 6. In a fifth feasible technical solution, the sliding plate 6 is a hemispherical plate, and the particles to be removed from impurities slide down along the spherical surface of the hemispherical plate.

In a sixth feasible technical solution, the sliding plate 6 is a semi-elliptical spherical plate, and the particles to be removed from impurities slide down along the elliptical surface of the semi-elliptical spherical plate.

However, the present invention is not limited to this. In other embodiments, the drainage device may also include one or more combinations of acceleration plates, sieve plates, screen meshes, ventilation plates, distributors, blow pipes, jet pipes, centrifugal devices, discharge holes and cyclones, as long as the granules to be removed can be dispersed and accumulation can be avoided.

In one embodiment, as shown in FIG. 2, a distributor 5 is provided at the inlet 12 of the granules, and the distributor 5 spreads the aggregates K1 to be removed on the drainage device, in order to make the impurity-removing granules K1 distributed on the drainage device in a dispersed state, so that the manner of distribution (such as uniformity, retention, etc.) can be adjusted.

Figure 23:
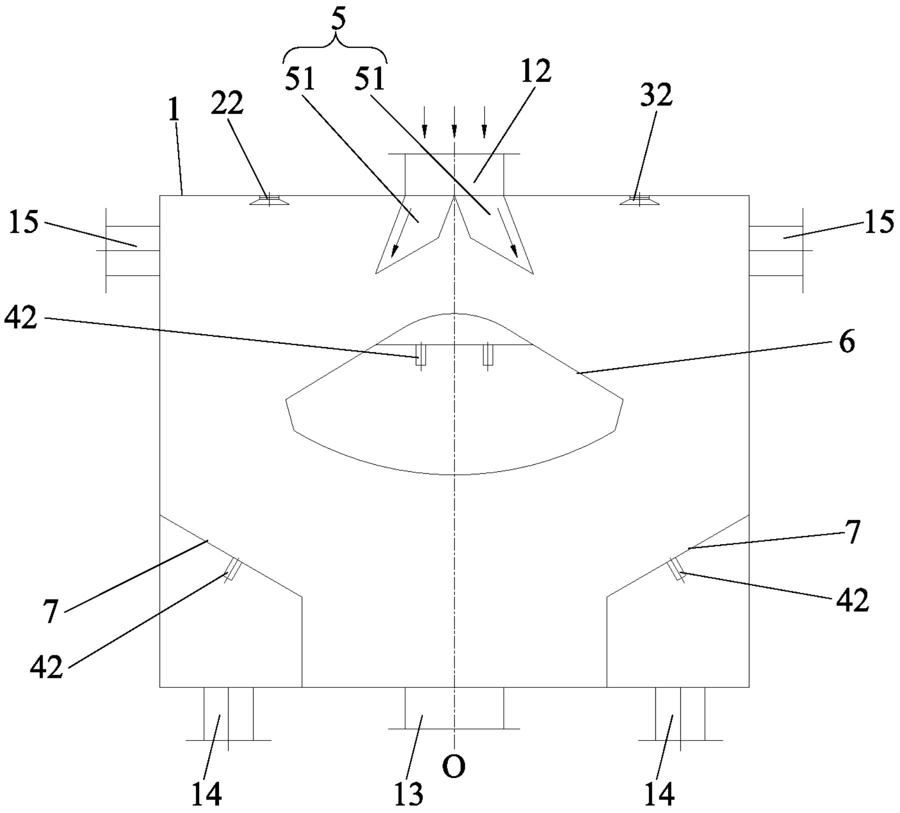
FIG. 23 is a schematic diagram of the third fabric way.
Figure 24:
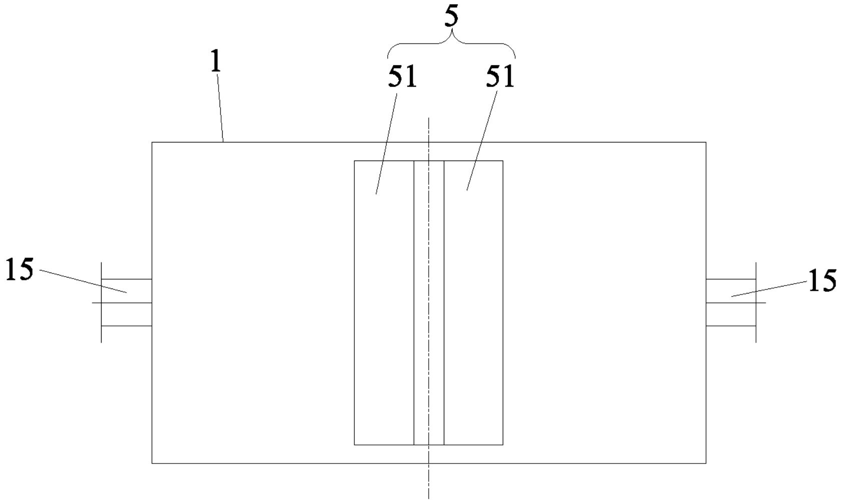
FIG. 24 is a top view of FIG. 23
Figure 25:
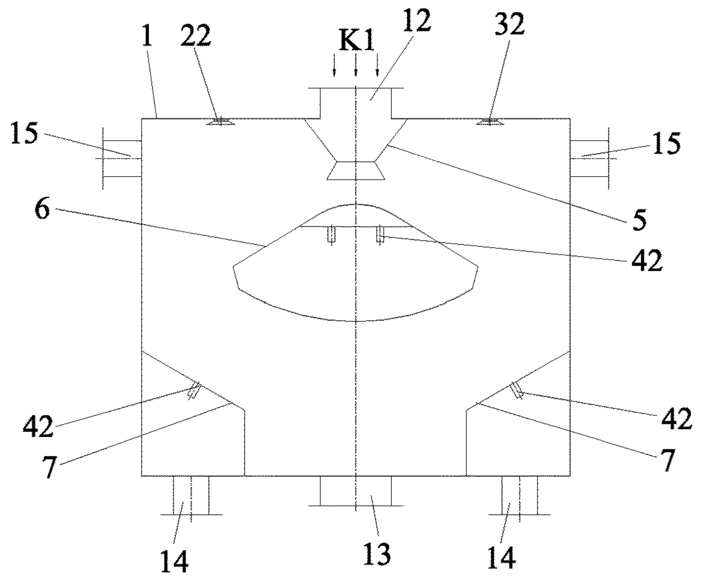
FIG. 25 is a schematic diagram of the fourth fabric way.
Figure 26:
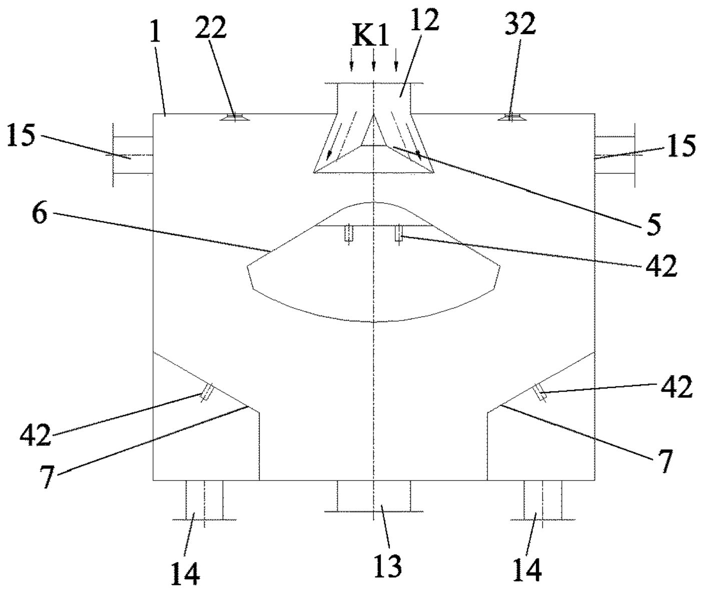
FIG. 26 is a schematic diagram of the fifth fabric way
Figure 28:
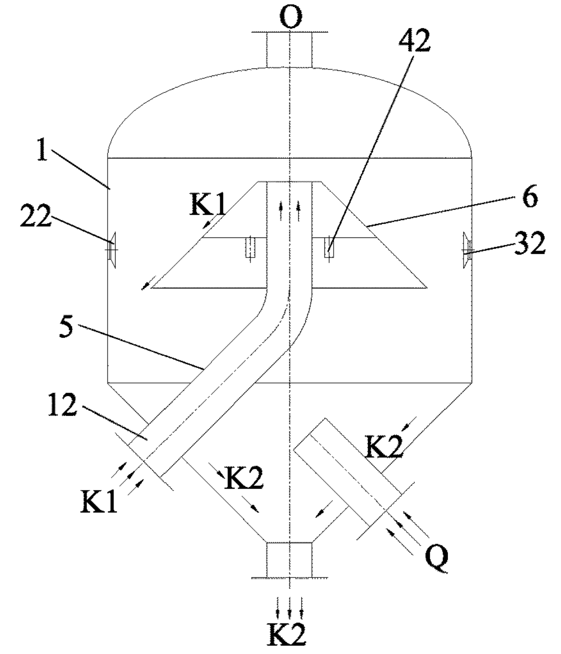
FIG. 28 is a schematic diagram of the sixth fabric way.

Regarding the fabric method, a fabric reference line O is defined, and the fabric can be fabricated on a single side of the fabric reference line O (as shown in FIG. 20, FIG. 21), or on both sides of the fabric reference line O (as shown in FIG. 23, FIG. 24), and also in the direction around the fabric reference line O (as shown in FIG. 25, FIG. 26, FIG. 28).

Figure 22:
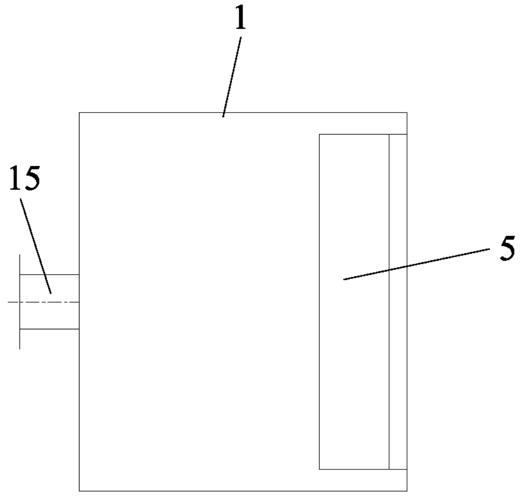
FIG. 22 is a top view of FIG. 21.
Figure 29:
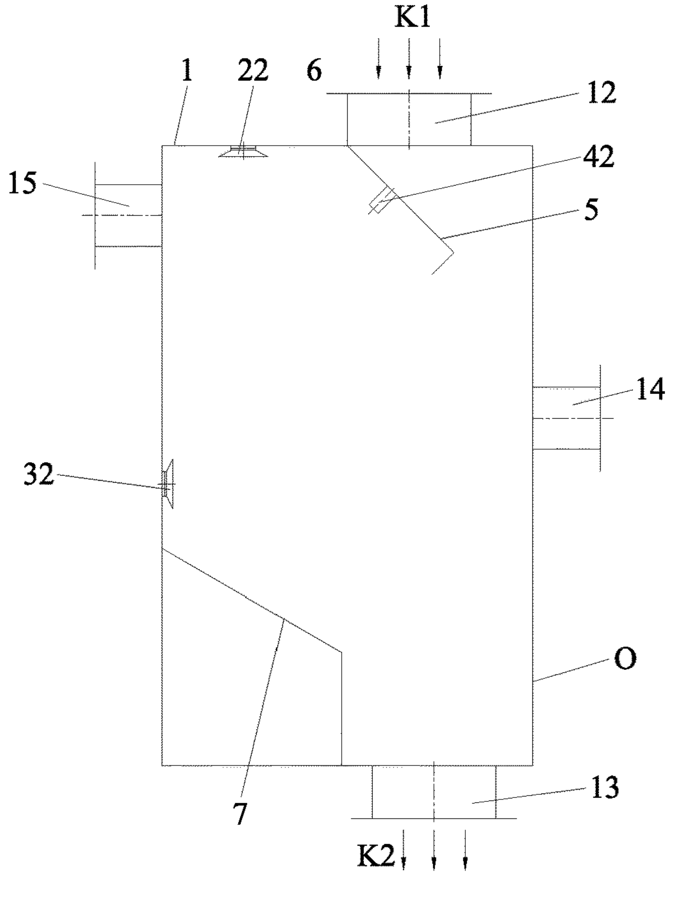
FIG. 29 is a schematic diagram of the seventh fabric way.

Regarding the distributor 5, there are at least the following embodiments:

In the first specific embodiment, the granule inlet 12, the distributor 5, the drainage device and the granule outlet 13 are all arranged on one side of the distribution reference line O, and the distribution reference line O is located on the side wall of the housing 1, and the distributor 5 is a straight cylinder (not shown in the figure), a sloping plate (as shown in FIG. 29), or the distributor 5 is an inclined casing inclined from top to bottom in the direction away from the distribution reference line O (as shown in FIG. 21, FIG. 22), in the example of FIG. 21 and FIG. 22, the cross-section of the inclined housing is rectangular. The fabric method of this embodiment is a single side fabric, suitable for use in combination with the diversion device of the second technical solution described above or the diversion device of the fourth technical solution.

In this embodiment, the drainage device may include a sliding plate 6 (as shown in FIG. 20 and FIG. 21), or may not include the sliding plate 6 (as shown in FIG. 29), and may include a fluidizing plate 7 (as shown in FIG. 20, FIG. 21, FIG. 29) or may not include the fluidizing plate 7.

In the second specific embodiment, as shown in FIG. 23 to FIG. 27, the fabric reference line O is the center line of the housing 1, and the fabric reference line O is the symmetry axis of the diverting device, and the fabric of this embodiment is fabric on both sides or in the surrounding direction of the fabric reference line O. It is suitable for use in combination with the drainage device of the first technical solution described above or the drainage device of the third technical solution.

In the first feasible technical solution of this embodiment, as shown in FIG. 23 and FIG. 24, the distributor 5 includes two feeders 51, the two feeders 51 are located on opposite sides of the fabric reference line O, the cross-section of the feeders 51 is rectangular, in the direction close to the drainage device, the two feeders 51 are inclined in the direction away from each other, the lower outlet of the two feeders 51 is a rectangular slit. The to-be-removed granules K1 flow out of the two feeders 51 and fall onto the diversion device. The fabric method of this scheme can be called the multi-slit fabric method.

Figure 31:
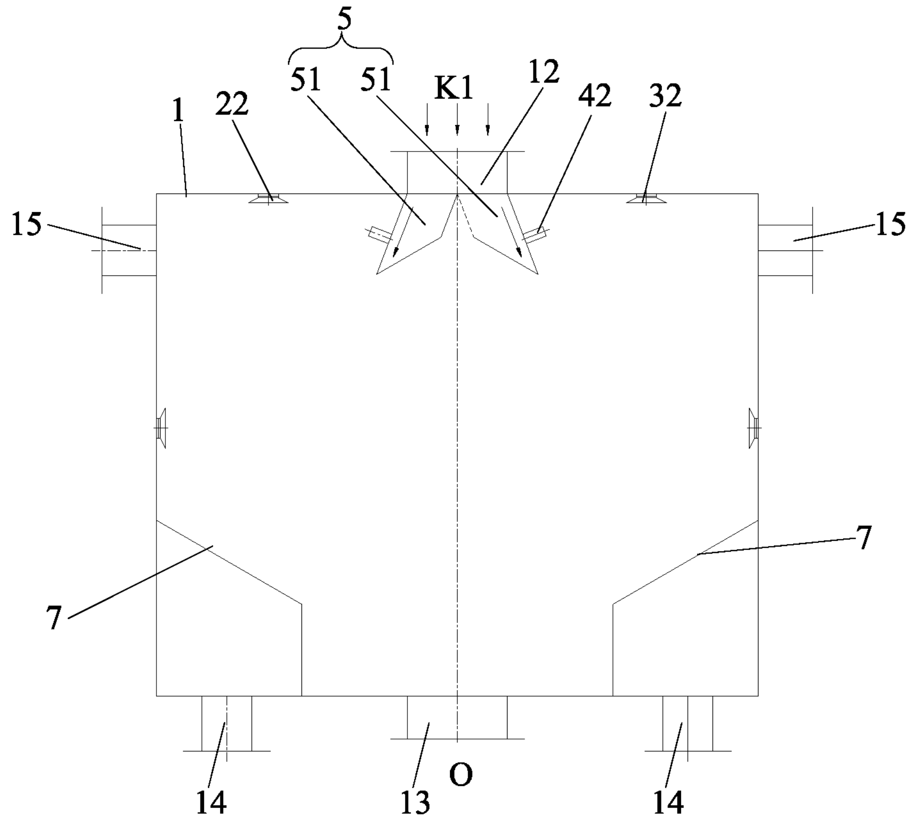
FIG. 31 is a schematic diagram of the ninth fabric way.
Figure 32:
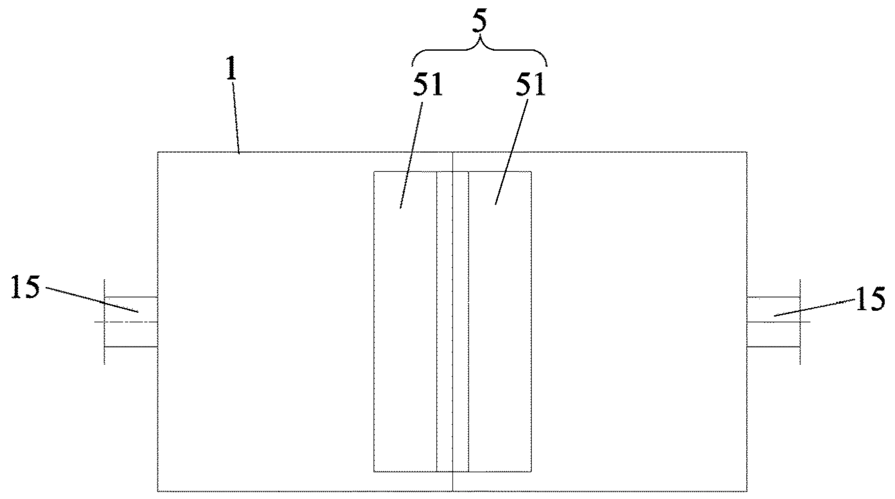
FIG. 32 is a top view of FIG. 31.

In this solution, the drainage device may include a sliding plate 6 (as shown in FIG. 23), or may not include the sliding plate 6 (as shown in FIG. 31 and FIG. 32), and may include a fluidizing plate 7 (as shown in FIG. 23 and FIG. 31) or may not include the fluidizing plate 7.

Figure 30:
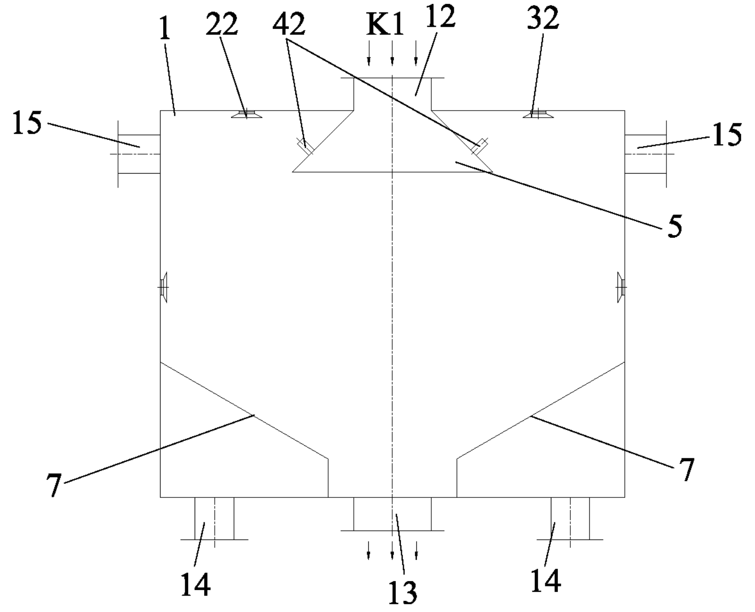
FIG. 30 is a schematic diagram of the eighth fabric way.

In the second feasible technical solution of this embodiment, as shown in FIG. 25, the distributor 5 is a conical cylinder, the fabric reference line O is the central axis of the conical cylinder, in the direction close to the diversion device, the diameter of the main body of the conical cylinder tapers, while the diameter of the outlet of the conical cylinder tapers, of course, it can also be the conical cylinder as a whole tapers from top to bottom (as shown in FIG. 30), to be debris granular material K1 flows through the conical cylinder, and then falls onto the drainage device. The fabric method of this scheme can be called conical fabric method.

In this embodiment, the drainage device may include the sliding plate 6 (as shown in FIG. 25) or may not include the sliding plate 6 (as shown in FIG. 30), and may include the fluidizing plate 7 (as shown in FIGS. 25 and 30) or may not include the fluidizing plate 7.

Figure 27:
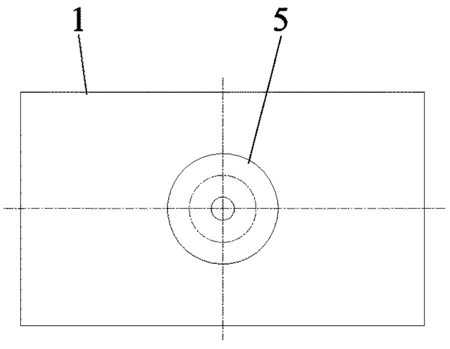
FIG. 27 is a top view of FIG. 26.

In the third feasible technical solution of this embodiment, as shown in FIG. 26 and FIG. 27, the distributor 5 is composed of two concentric cones set at intervals inside and outside, and the fabric reference line O is the central axis of the two cones, and the diameters of the two cones are gradually expanded in the direction close to the diversion device, and the gap between the two cones is an annular gap, and the impurity-removing granules K1 flow through the annular gap between the two cones, and then fall on the drainage device. The fabric method of this scheme can be called ring fabric method.

Figure 33:
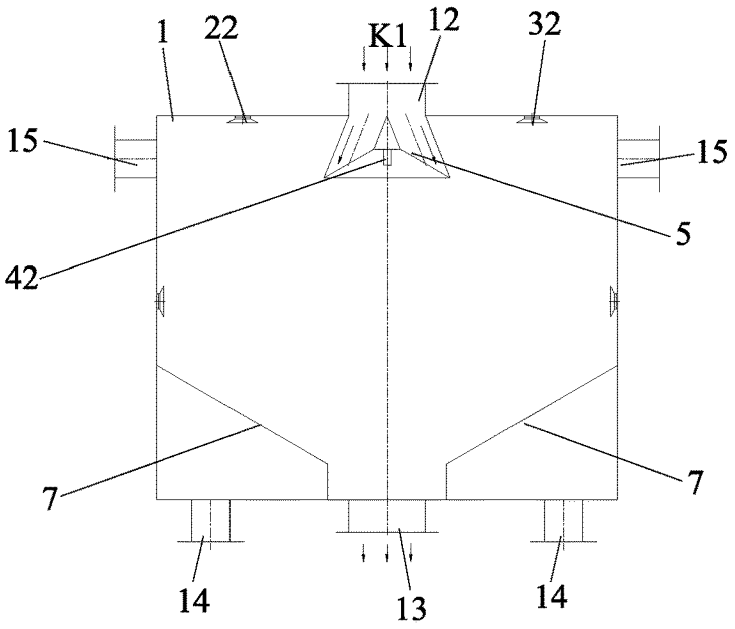
FIG. 33 is a schematic diagram of the tenth fabric way.
Figure 34:
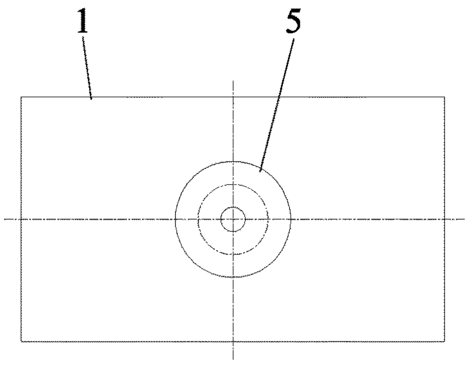
FIG. 34 is a top view of FIG. 33.

In this embodiment, the drainage device may include the sliding plate 6 (as shown in FIG. 26) or may not include the sliding plate 6 (as shown in FIGS. 33 and 34), and may include the fluidizing plate 7 (as shown in FIGS. 26 and 33) or may not include the fluidizing plate 7.

In the above three technical solutions of this embodiment, the granule inlet 12 is located above the diversion device, that is, the fabric 5 is located above the drainage device, and the "direction close to the drainage device" mentioned above is also the direction from top to bottom.

In the above embodiments, when the sliding plate 6 is not set, the second high frequency acoustic wave converter 42 can be set on the fabric 5 (as shown in FIG. 29 to FIG. 34).

However, the present invention is not limited to this, and the second high-frequency acoustic wave generating device can also be connected to other solid substances in the separation cavity 11 that are in contact with the particles.

In the third specific embodiment, as shown in FIG. 28, the fabric reference line O is the center line of the housing 1, the drainage device includes the sliding plate 6, the fabric reference line O is the symmetry axis of the sliding plate 6, the granule inlet 12 is located below the sliding plate 6 and on the side of the fabric reference line O, the distributor 5 is a bent tube, the bent tube extends from the granule inlet 12 toward the oblique upper part near the fabric reference line O, extends to the bottom center of the sliding plate 6, and then passes through the sliding plate 6 along the fabric reference line O and extends to the top of the sliding plate 6, and the impurity-removing granules K1 flows upward in the bend tube and falls to the top of the sliding plate 6 after rushing out of the bend tube, and then slides downward along the sliding plate 6. The fabric method of this embodiment can be called the panning fabric method. In this embodiment, sliding plate 6 can be a conical cylinder, hemispherical plate or semi-ellipsoidal plate; the drainage device can not include fluidizing plate 7, but rely on the inverted conical inner wall of the lower part of housing 1 to guide the granule material to slide down to the granule outlet 13.

In one embodiment, the granule outlet 13 is also provided with a receiving device for bringing together the clean granules K2, so that the clean granules K2 converge and then flow out of the granule outlet 13. The collecting device is, for example, a funnel-shaped structure.

In one embodiment, the housing 1 is provided with an air inlet 14 and an air outlet 15 respectively connected to the separation cavity 11, and a fan is provided at the air inlet 14 and/or the air outlet 15, i.e., a fan/blower is provided at the air inlet 14 and/or an induced draft fan is provided at the air outlet 15, and the airflow can carry impurities out of the air outlet 15.

Further, as shown in FIG. 1, valves 8 are provided at the granule inlet 12, the granule outlet 13, the air inlet 14 and the air outlet 15 for easy operation and control.

In one embodiment, the device may further include at least one of a plasma generator, a microwave generator, an infrared generator, a dry ice delivery port, such as including any two, three or four. The plasma generator is used to apply plasma to the granules to be debrided, the microwave generator is used to apply microwaves to the granules to be debrided, the infrared generator is used to apply infrared light to the granules to be debrided, and the dry ice delivery port is used to deliver dry ice to the granules to be debrided, thereby further improving the effect of removing impurities. In this embodiment, the plasma generator, the microwave generator and the infrared generator can be located inside the housing 1, and the dry ice delivery port can be opened on the shell wall of the housing 1.

Implementation III

As shown in FIG. 1, the present invention also provides a device for removing impurities from a granule, the device including a housing 1 having an internal separation cavity 11, further including at least one of a low-frequency acoustic wave generation device 2, a first high-frequency acoustic wave generating device 3 and a high-frequency acoustic wave solid guide assembly, and a supply fan for introducing a gas flow Q into the separation cavity 11 or/and an induced draft fan for drawing out the gas flow Q. The low-frequency acoustic waves emitted by the low-frequency acoustic wave generating device 2 and the high-frequency acoustic waves emitted by the first high-frequency acoustic wave generating device 3 can use the gas in the separation cavity 11 as a wave guide medium, are transmitted to the particles to be removed in the separation cavity 11, the high-frequency acoustic wave solid guide assembly includes a connected second high-frequency acoustic wave generating device 4 and a solid wave guide medium, which needs to be set in the separation cavity 11 and is located on the only path of the particles K1 to be removed. The high-frequency acoustic waves emitted by the second high-frequency acoustic wave generating device 4 use the solid wave guide medium as a wave guide medium, and are transmitted to the particles K1 to be removed in the separation cavity 11, and act on the low-frequency acoustic waves and/or the particles to be removed. The high-frequency acoustic wave can weaken the binding force between the granules and the impurities in the granules to be removed K1, and the airflow Q generated by the fan can blow the impurities away from the granules, so that the impurities and the granules are completely separated, and the clean granules K2 are obtained.

Other structures and working principles of the device in this implementation are the same as those described in Implementation II for removing impurities in granules, so it is not repeated.

The method and device of the present invention utilize the characteristics of different frequency bands of acoustic waves, organically combine low-frequency acoustic waves with high-frequency acoustic waves, and organically combine gas guided waves with solid guided waves, so as to weaken or even remove the combination between the particles and the impurities attached to its surfaces. With the help of the equipped wind and airflow, the particles and impurities that have eliminated the binding force are further separated and sent to the downstream respectively, so as to realize the efficient separation of the particles and impurities, and to achieve the purpose of deep cleaning of granular materials.

The invention solves the difficulty and key point of granule cleaning, that is, it transforms the attached impurities attached to the surface of granules by the combination of electromagnetic force, liquid bridge force and van der Waals force into dispersed impurities, so that the attached impurities can be separated out effectively and the clean efficiency of granules can make a qualitative leap, and the test shows that the clean value of granules can be increased by 10 PPM on average by using the invention under the same conditions. More than, the invention is low investment cost, safe and reliable, environmental protection, stable operation, and easy to achieve, easy to transform and upgrade the equipment with backward technology and low clean efficiency, small investment and significant effect.

The method and device of the present invention can be combined with other methods for removing the binding force or separation of granules and impurities. For example, it is combined with a method or device for removing impurities by electromagnetic field, ion wind, sieve plate, fluidized bed, impact plate, elutriator, spray, electrostatic, mechanical, screen, etc.

The methods and devices of the present invention achieve the separation of granules from impurities, and, to put it another way, also achieve the collection of impurities of the type of powder or particles, which is equivalent to the rejection of the larger particles in the powder or particles.

The above description is only a schematic and specific implementation of the present invention and is not intended to limit the scope of the invention. Any equivalent changes and modifications made by any person skilled in the art, without departing from the conception and principles of the present invention, shall fall within the scope of protection of the present invention. Moreover, it should be noted that the components of the present invention are not limited to the above-mentioned overall application, and each technical feature described in the specification of the present invention can be selected for adoption alone or selected for use in combination with several others according to practical needs, so that the present invention covers, as a matter of course, other combinations and specific applications related to the inventive point of the case.

What is claimed is:

1. An impurity removal device for removing impurities in granules, comprising a shell with a separation cavity, wherein the impurity removal device further comprises A) a first acoustic wave generating device and a second acoustic wave generating device, or B) the first acoustic wave generating device, the second acoustic wave generating device and an acoustic wave solid guide assembly;

wherein the impurity removal device is configured such that the first acoustic wave generating device automatically emits first acoustic waves having frequencies in the range of 1 Hz-350 Hz and the second acoustic wave generating device automatically emits second acoustic waves having frequencies in the range of 6 kHz-40 kHz simultaneously with the first acoustic wave generating device emitting the first acoustic waves having the frequencies in the range of 1 Hz-350 Hz, wherein the first acoustic waves emitted by the first acoustic wave generating device and the second acoustic waves emitted by the second acoustic wave generating device are configured to be transmitted to the granules to be removed in the separation cavity by using a gas as a wave guide medium, wherein the acoustic wave solid guide assembly comprises a connected third acoustic wave generating device and a solid wave guide medium, third acoustic waves emitted by the third acoustic wave generating device are configured to be transmitted by the solid wave guide medium to the granules to be removed in the separation cavity, wherein the third acoustic waves have frequencies in the range of 6 kHz-40 KHz.

2. The impurity removal device according to claim 1, further comprising a blower and an induced draft fan, wherein the blower is configured to introduce the air flow into the separation cavity, wherein the induced draft fan is for drawing the air flow in the separation cavity and wherein the shell is provided with a granule inlet and a granule outlet respectively communicating with the separation cavity, and the separation cavity is provided with a drainage device for guiding the granules to be removed in a dispersed state in the separation cavity, and the drainage device is arranged between the granule inlet and the granule outlet.

3. The impurity removal device according to claim 2, wherein at least part of the drainage device is connected to the third acoustic wave generating device as the solid wave guide medium.

4. The impurity removal device according to claim 2, wherein the device further comprises a distributor arranged at the granule inlet, and the distributor spreads the granules to be removed on the drainage device.

5. The impurity removal device according to claim 4, wherein the distributor is connected to the third acoustic wave generating device as the solid wave guide medium.

6. A method for removing impurities in granules, comprising: providing the impurity removal device according to claim 1; adopting at least one mode selected from the group consisting of a low-frequency acoustic wave gas guided wave mode, a high-frequency acoustic wave gas guided wave mode and a high-frequency acoustic wave solid guide mode, an acoustic wave is transmitted to the granules to be removed to weaken a binding force between the granules and the impurities in the granules to be removed, and at the same time, a separation of the impurities and the granules is assisted by an air flow; wherein: the low-frequency acoustic wave gas guided wave mode is that a low-frequency acoustic wave is transmitted by using a gas as a wave guide medium; the high-frequency acoustic wave gas guided wave mode is that a high-frequency acoustic wave is transmitted by using the gas as the wave guide medium; the high-frequency acoustic wave solid guide mode is that the high-frequency acoustic wave is transmitted by using a solid body as the wave guide medium.

7. The method according to claim 6, wherein the at least one mode selected from the group consisting of the low-frequency acoustic wave gas guided wave mode, the high-frequency acoustic wave gas guided wave mode and the high-frequency acoustic wave solid guide mode is adopted, and the acoustic waves are transmitted to the granules to be removed, comprising:

at least two modes selected from the group consisting of the low-frequency acoustic wave gas guided wave mode, the high-frequency acoustic wave gas guided wave mode and the high-frequency acoustic wave solid guide mode are adopted to transmit the acoustic waves to the granules to be removed.

8. The method according to claim 6, wherein, a frequency of the low-frequency acoustic wave in the low-frequency acoustic wave gas guided wave mode is one frequency or a combination of multiple frequencies;

a frequency of the high-frequency acoustic wave in the high-frequency acoustic wave gas guided wave mode is one frequency or a combination of multiple frequencies;

a frequency of the high-frequency acoustic wave in the high-frequency acoustic wave solid guide mode is one frequency or a combination of multiple frequencies.

9. The method according to claim 6, wherein, a waveform of the low-frequency acoustic wave in the low-frequency acoustic wave gas guided wave mode is one waveform or a combination of multiple waveforms;

a waveform of the high-frequency acoustic wave in the high-frequency acoustic wave gas guided wave mode is one waveform or a combination of multiple waveforms;

a waveform of the high-frequency acoustic wave in the high-frequency acoustic wave solid guide mode is one type of waveform or a combination of multiple types of waveforms.

10. The method according to claim 6, wherein, an amplitude of the low-frequency acoustic wave in the low-frequency acoustic wave gas guided wave mode is one amplitude or a combination of multiple amplitudes;

an amplitude of the high-frequency acoustic wave in the high-frequency acoustic wave gas guided wave mode is one amplitude or a combination of multiple amplitudes;

an amplitude of the high-frequency acoustic wave in the high-frequency acoustic wave solid guide mode is one amplitude or a combination of multiple amplitudes.

11. The method according to claim 6, wherein a frequency of the low-frequency acoustic wave is 1 Hz~350 Hz, and a frequency of the high-frequency acoustic wave is 6 kHz~40 kHz.

12. The method according to claim 6, wherein the at least one selected from the group consisting of the low-frequency acoustic wave gas guided wave mode, the high-frequency acoustic wave gas guided wave mode and the high-frequency acoustic wave solid guide mode is adopted, and the acoustic waves are transmitted to the granules to be removed, comprising:

in a state of a flow of the granules to be removed, the at least one selected from the group consisting of the low-frequency acoustic wave gas guided wave mode, the high-frequency acoustic wave gas guided wave mode and the high-frequency acoustic wave solid guide mode is configured to transmit the acoustic wave to the granules to be removed.

13. The method according to claim 6, wherein the at least one selected from the group consisting of the low-frequency acoustic wave gas guided wave mode, the high-frequency acoustic wave gas guided wave mode and the high-frequency acoustic wave solid guide mode is adopted, and the acoustic waves are transmitted to the granules to be removed, comprising:

in a state of applying at least one selected from the group consisting of plasma, microwave, infrared, and dry ice to the granules to be removed, the at least one selected from the group consisting of the low-frequency acoustic wave gas guided wave mode, the high-frequency acoustic wave gas guided wave mode, and the high-frequency acoustic wave solid guide mode is adopted, and the acoustic waves are transmitted to the granules to be removed.

14. An impurity removal device for removing impurities in granules, wherein the device comprises a shell with a separation cavity, and the device further comprises a first acoustic wave generating device, a second acoustic wave generating device and an acoustic wave solid guide assembly;

wherein the impurity removal device is configured such that the first acoustic wave generating device automatically emits first acoustic waves having frequencies in the range of 1 Hz-350 Hz in a gas medium, the second acoustic wave generating device automatically emits second acoustic waves having frequencies in the range of 6 kHz-40 kHz in the gas medium simultaneously with the first acoustic wave generating device emitting the first acoustic waves having the frequencies in the range of 1 Hz-350 Hz, the acoustic wave solid guide assembly automatically emits third acoustic waves, and the acoustic wave solid guide assembly comprises a connected third acoustic wave generating device and a solid wave guide medium through which the third acoustic waves are transmitted, wherein the third acoustic waves have frequencies in the range of 6 kHz-40 kHz.

15. The impurity removal device according to claim 14, further comprising a blower and an induced draft fan, wherein the blower is configured to introduce the air flow into the separation cavity and wherein the induced draft fan is configured to draw out the air flow, wherein the shell is provided with a granule inlet and a granule outlet respectively communicating with the separation cavity, and the separation cavity is provided with a drainage device for guiding the granules to be removed in a dispersed state in the separation cavity, and the drainage device is arranged between the granule inlet and the granule outlet.

16. The impurity removal device according to claim 15, wherein at least part of the drainage device is connected to the third acoustic wave generating device as the solid wave guide medium.

17. The impurity removal device according to claim 15, wherein the device further comprises a distributor disposed at the granule inlet, the distributor spreads the granules to be removed on the drainage device.

18. The impurity removal device according to claim 17, wherein the distributor is connected to the third acoustic wave generating device as the solid wave guide medium.

19. The impurity removal device according to claim 14, wherein the device further comprises at least one selected from the group consisting of a plasma generator, a microwave generator, an infrared generator, and a dry ice injection port.

* * * * *